May 9, 1939.  G. I. McFARLAND  2,157,421
COMPENSATING PIPE OR SEWER CLEANER OR SCRAPER
Filed March 3, 1937
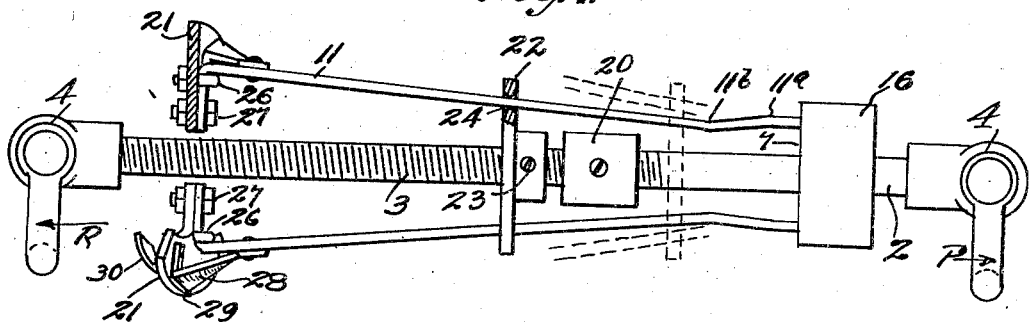
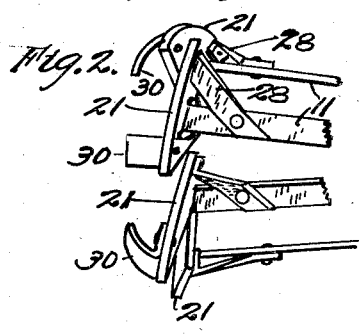
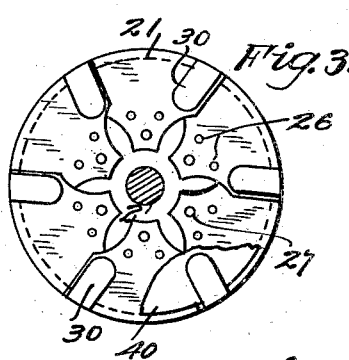
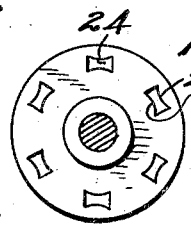
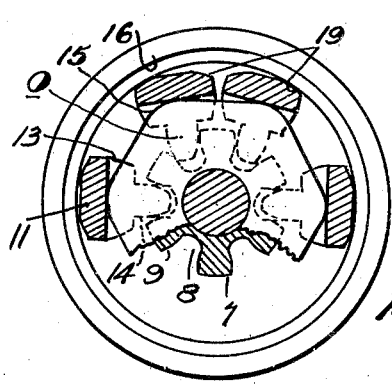
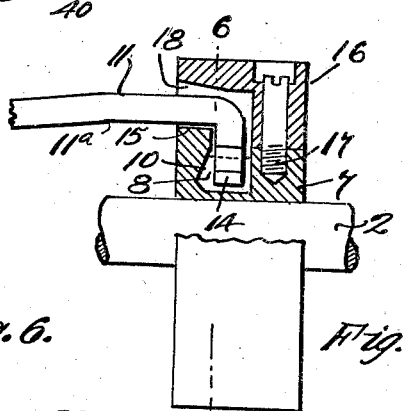
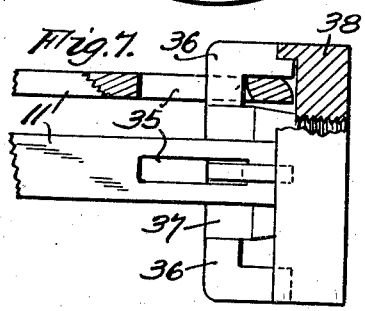
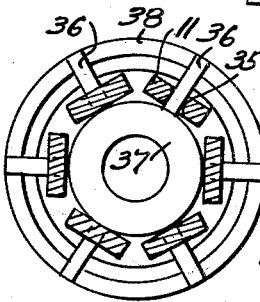
INVENTOR,
G. I. McFarland,
By
F. E. Maynard,
his Atty.

Patented May 9, 1939

2,157,421

UNITED STATES PATENT OFFICE 2,157,421

COMPENSATING PIPE OR SEWER CLEANER OR SCRAPER

George I. McFarland, Mesa, Ariz.

Application March 3, 1937, Serial No. 128,777

8 Claims. (Cl. 15—104.18)

This invention is a portable tool for internally scraping the inner wall surface of various types of conduits, tubes and pipes in their place of permanent installation.

In the cleaning of long lines of conduits, sewers and other tubes it is very desirable to provide for the effective scraping of the surface of the bore and to provide a tool which may be used with safety against its becoming interlocked in crevices of the wall and against its being so wedged in the chamber as to be liable to actual loss, with a result of having to dismantle the pipe line at some point, or in the case of sewers of having to resort to a very expensive digging job.

It is therefore an object of this invention to provide a scraping tool which has the capacity of readily breaking loose in the event of becoming interlocked in the bore being scraped.

A further object is to provide a self-collapsing scraper which may be readily retrieved by a reverse or pull back operation of its attached operating apparatus. An additional object is to provide a tube scraper which is of extremely simple structure, of substantial and durable parts which may be easily adjusted for effective operation on bore walls of different diameter. Particularly, an object is to provide a scraper of this class having an annular gang of scraper blades connected to a relative series of spring arms having ends pivotally anchored to a carrier in such a manner that the blades on the outer ends of the arms may readily positionally adjust themselves in conformation to the cross-section outline of the sewer or other bore; that is, may take a circular or an oval arrangement to correspond to the bore shape in a given scraping job.

Also, an object is to provide a bore scraper which incorporates a set of effective blades which have, each, front and rear face means to facilitate adjustment and shift of the tool in a cleaning operation.

The invention consists of certain advancements in the apparatus of this art, that is bore scraping, as set forth in the ensuing disclosure and having, with the above, additional objects and advantages as hereinafter developed, and whose manner of operation and construction, combination and means, and details of features will be made manifest in the description of the herewith annexed illustration; it being understood that modifications, variations and adaptations may be resorted to within the scope, principle and spirit of the invention as it is more directly claimed in the appendix.

Figure 1 is a sectional, longitudinal elevation of the tool, showing the scraper blades in full lines in retracted position ready for insertion in a bore. Figure 2 is a side elevation of a gang of blades to show helical pitch of each blade and its relative position to others in the gang. Figure 3 is a rear end view of the gang of blades. Figure 4 is a face view of the spring arm bridle disc. Figure 5 is a sectional elevation of the anchoring device for contiguous ends of the blade arms, and Figure 6 is a cross-section thereof substantially on line 6—6 of Fig. 5 looking towards the right. Figure 7 is a sectional elevation, and Figure 8 is a cross-section looking towards the right of Fig. 7 of a form of hook-and-eye anchoring device for the arms.

The tool embodies a stout, central bar 2 having a considerably threaded part 3 and each end being provided with a suitable shackle 4 for attachment of a pulling cable at P, and of a retrieving cable at R. Freely turnable and slidable on the plain end of the bar 2 is a suitably constructed hitch device shown in Figs. 5 and 6 as including an inner collar 7 having a series of radial pockets 8 having laterally flared mouths 9, Fig. 6, and being undercut at 10, Fig. 5, to receive the inturned or hook ends of longitudinally disposed spring arms 11.

The inturned ends 13 of the arms are reduced in width to form narrow teeth 14 radially sliding in their pockets and capable of laterally oscillating in the mouths 9 of the pockets on centers O, Fig. 6, which are the centers of arcuate ridges 15 spaced around the rim of the collar 7 to form bearings for the contiguous faces of the spring arms 11. The hooked in ends 13 of the several arms 11 are overlapped loosely by an outer thimble 16 fitting on the slidable collar 7 and fixed thereto by screws 17. The clearance 10 of each pocket 8 allows the end tooth 14 therein to play as the arm 11 is tilted outwardly from the bar 2, as shown in dotted lines, Fig. 1, and the bore of the thimble 16 is flared at 18 to provide tolerance for the end of the arm. Also, the hook ends of the several arms are bevelled off at 19, Fig. 6, for working clearance in the thimble as the arms may oscillate on the ridge centers O.

Fixed on the bar 2 is an adjustable stop collar 20 which abuts the carrier collar 7 when the bar 2 is pulled forward, that is to the right through the collar, Fig. 1; the amount of spread of the arms 11 being determined by the longitudinal adjustment of the stop 20 on the bar 2.

While the hook ends of the several arms 11 fulcrum in the carrier 7 their opposite ends are adapted to be expanded or retracted as desired, and to be positively gaged so as to properly position a gang of segmental blades or plates 21 in a discal formation of diameters within a given range. The arm controlling means is here shown as including a bridle disc 22 whose hub is threaded on the threaded part 3 of the rod or bar 2 and if the bar is turned while the arm assembly is held against rotation the disc 22 will shift toward or from the stop collar 20, and is then fixed by a set screw 23, or in other desired manner.

The bridle disc 22 is provided with a number of apertures 24 from face to face and the several arms 11 slidably pass through these apertures and are suitably attached to the segmental blades 21.

The apertures 24 of the disc 22 are shown in Fig. 4 as having reverse, convex, top and bottom walls 25 to provide for transverse oscillation of the arms therein as the hooked ends of the arms 11 may have occasion to oscillate in their pockets 8 in the carrier device 7, as above set forth. Also the pockets 8 and the disc apertures are designed to allow of some degree of diagonal tilt of the arms in the bridle disc as to the axis of the bar 2 incidental to the oscillation of the arms to bring their scraping blades 21 into scraping position on a bore wall of other than circular section; that is for action on and conformation to oval-section bore walls. This conformation is also facilitated by the flexibility of the arms 11.

The bridled ends of the arms 11 are shown in Fig. 1, as turned in at the face of the divers blades 21 and fastened by U-bolts 26 and plain bolts 27 to the respective segmental blades, and these are shown in Fig. 2 as arranged slightly helically of the bar 2 in a circle around the bar and in diagonal overlapping, but clearing, organization in the gang. Each arm 11 is attached to its blade 21 by an oblique, guide-forming brace 28 extending to the rim of its relative blade as at 29, Fig. 1 for the purpose of guiding the arm into the end of a pipe and over the edges of crevices, shoulders and obstructions in a bore being scraped, and aiding in cutting and scraping action of the tool.

Fixed to the reverse side or back of each blade 21 is an inwardly turned, guide forming horn 30 arranged at the outer, trailing corner of its blade, whereby to assist in riding the blades over obstructions in the retractive operation of the tool in the direction R, Fig. 1, in cases when it cannot be pulled farther in direction P, in a bore.

The arms are bent inward at the points 11ª and then outward at 11ᵇ, relatively nearer the fulcrumed ends of the arms. From the contracted position of the arms 11 they may be uniformly spread or expanded by screwing the bridle disc 22 toward the stop collar 20. When adjusted to the desired position according to the size of the bore to be scraped the tool is hitched to a pulling cable at the end P of the rod or bar 2, and to a pull-back or retracting cable at the end R. As the tool is pulled forward the bridle disc 22 moves along the arms 11 until the blades are pressed firmly out to scraping engagement with the pipe bore wall; the carrier device 7 resting against the stop collar 20 and taking the strain of the pull while the blades are scraping; reaction pressure being derived from the spring arms 11 which are now fulcrumed on the slot walls in the disc 22.

In event one or more of the blades 21 should hook on an obstacle in the bore an increase of pulling tension will result in an inward deflection of the impeded arm 11 with the disc 22 serving as a fulcrum. Upon this self-releasing action of the retarded blade the tool may then again move forward. If for any cause it is not possible to continue the advance of the tool in a pipe then tension is placed on the pull-back end R of the tool with the result that the bar and the stop collar 20 shift to the left, Fig. 1, relative to the spring arm unit with the blades 21, and as the bridle disc 22 moves with the bar 2 the spread arms 11 will be automatically collapsed to a lesser disc forming position of the blades 21 and these will therefore be free to permit retraction of the entire tool from the pipe bore.

Because of the automatic contracting and expanding capacity of the tool mechanism the tool can be pulled back and forth in a bore several times without need of disconnecting the hitches 4 from the cables.

A modified form of arm connecting carrier is shown in Figs. 7 and 8, wherein the arms 11 have elongated eyes 35 from top to bottom to receive radial hooks 36 of a collar 37 onto which is screwed a retaining ring 38 interengaging with the hooks and preventing dislocation of the arms ends from the hooks, but providing for the desired swing and oscillation of the arms in the manner above stated.

The tool may be converted into a sand washer if so desired by introducing between the shackle 4 at the left end and the gang of blades 21 a stout rubber disc having a diameter to fit within the ring of guides 30, Fig. 3, when the blades are in contracted position to fit the given size of washing disc to be employed. When the tool is pulled forward slowly water turned in at the rear of the applied disc will flush past the rim of the disc and around the scraping blades. The disc is indicated broken away at 40 and in dotted lines on the rear of the blades, Fig. 3.

What is claimed is:

1. A bore scraping tool including a draw bar, an annular gang of scraping blades concentric with the draw bar having respective spring arms and means slidably mounted on the bar and to which the arms are hingedly connected at one end and have laterally tilting motion on their longitudinal axes to provide for radial expansion of the blades to bores of different diameters and for their automatic conformation to circular or oval section bores, and bridle means fixed on the bar and in which the arms are longitudinally slidable and laterally tiltable; the arms converging toward their hinged ends.

2. A bore scraping tool adapted for use in circular or oval bores and including a carrier to which are hinged for radial movement and lateral tilting action the adjacent ends of spring arms having at their free ends transversely fixed blades in an annular gang concentric to the axis of the carrier and the arms converging toward the carrier, a draw bar on which the carrier is slidably and turnably mounted, a bridle device fixed to the draw bar and in which the lateral, inclined arms are radially restrained and longitudinally slidable and which device provides for said lateral tilt of the arms; said blades being moved radially by and with their arms as these are concurrently shifted axially in the fixed bridle device.

3. A bore scraping tool including a draw bar, a set of outwardly divergent, spring arms lying along and arranged in annular formation around the bar and having fixed to one end a gang of scraping blades concentric to the bar, and means slidable on the bar and in which the converged ends of the arms are hinged for radial adjustment of the blades and are rockably interlocked to provide a lateral tilting action so that the blades may automatically tilt and adjust themselves in oval section bores, and an axially adjustable fulcrum device on the bar and in which the arms are mounted and are laterally tiltable and longitudinally slidable and are controlled.

4. A bore scraper including a draw bar, elongate spring arms arranged divergently and longitudinally along the bar and annularly thereabout and having a gang of transverse scraper blades fixed on one end of the set of arms, a transverse disc concentric to and adjustable along the bar and in which the arms are fulcrumed and adapted to tilt laterally, and a carrier slidably and turnably mounted on the bar and to which adjacent ends of the arms longitudinally converge as to the axis of the bar and are connected for both a hinging and a lateral tilting action so that the arms may automatically position themselves in scraping arrangement and relation in an oval bore.

5. A tool as set forth in claim 4, and in which disc the arms laterally tilt and have longitudinal movement as the bar shifts in the carrier; the spring of the arms facilitating the oval adjustment of the blades in position.

6. A bore scraping tool having a draw bar, a carrier slidably mounted on the bar, divergent arms extending longitudinally of the bar and whose converged ends are hingedly and transversely tiltably connected to said carrier, scraper blades transversely fixed on the spread ends of the arms, and a transverse disc fixed on the bar having elongate eyes with convexly curved inner and outer walls between which the respective arms are slidable and are transversely tiltable.

7. A bore scraping tool including a set of divergent arms, a bar, a carrier slidable thereon and having radial pockets; said arms having transverse end blades and converging toward and having ends interhooked in said pockets and providing for relative radial swing and lateral tilting adjustment of each of the arms for positioning said blades against a bore surface, an arm fulcrum device mounted on the bar and in which the arms are laterally tiltable and axially slidable, and means for retaining the arms in the said pockets and providing for swinging and lateral tilting of the arms.

8. A tool of the class described including a carrier having radial pockets and a draw bar slidably supporting the carrier, and a set of arms arranged laterally and longitudinally of the bar and including reduced tooth parts converged to and pivoted in the carrier; said pockets being flared to permit lateral tilt of the teeth therein, and a fulcrum device fixed on the bar and in which the arms are slidable and laterally tiltable and restrained from radial movement in the device.

GEORGE I. McFARLAND.